United States Patent
Farb et al.

(10) Patent No.: US 9,080,555 B2
(45) Date of Patent: Jul. 14, 2015

(54) HYDROELECTRIC IN-PIPE TURBINE BLADES

(75) Inventors: Daniel Farb, Beit Shemesh (IL); Joe Van Zwaren, Beit Shemesh (IL); Avner Farkash, Beit Shemesh (IL); Ken Kolman, Beit Shemesh (IL)

(73) Assignee: Leviathan Energy Hydroelectric Ltd., Beit Shemesh (IL)

( * ) Notice: Subject to any disclaimer, the term of this patent is extended or adjusted under 35 U.S.C. 154(b) by 629 days.

(21) Appl. No.: 13/322,574

(22) PCT Filed: May 26, 2010

(86) PCT No.: PCT/IB2010/052337
§ 371 (c)(1),
(2), (4) Date: Nov. 28, 2011

(87) PCT Pub. No.: WO2010/136978
PCT Pub. Date: Dec. 2, 2010

(65) Prior Publication Data
US 2012/0068464 A1   Mar. 22, 2012

Related U.S. Application Data

(60) Provisional application No. 61/180,949, filed on May 26, 2009, provisional application No. 61/224,925, filed on Jul. 13, 2009, provisional application No. 61/244,083, filed on Sep. 21, 2009.

(51) Int. Cl.
| F03B 13/10 | (2006.01) |
| F03B 3/12 | (2006.01) |
| F01D 5/14 | (2006.01) |
| F03D 3/06 | (2006.01) |
| F03D 11/04 | (2006.01) |
| F03D 1/04 | (2006.01) |

(52) U.S. Cl.
CPC .... *F03D 3/061* (2013.01); *F03D 1/04* (2013.01); *F03D 3/062* (2013.01); *F03D 11/04* (2013.01); *F05B 2220/7068* (2013.01); *F05B 2240/301* (2013.01); *F05B 2240/40* (2013.01); *F05B 2250/71* (2013.01); *F05B 2280/5008* (2013.01); *Y02E 10/28* (2013.01); *Y02E 10/728* (2013.01); *Y02E 10/74* (2013.01)

(58) Field of Classification Search
USPC .......... 415/3.1, 4.1, 4.3, 4.5, 7, 8, 54.1, 54.7, 415/220, 218.1, 219.1, 223, 906, 908; 416/197 R, 197 A, 197 B, 41, 242
See application file for complete search history.

(56) References Cited

U.S. PATENT DOCUMENTS

| 96,573 | A | * | 11/1869 | Fredenburr et al. | 416/197 R |
| 255,259 | A | * | 3/1882 | Donnelly | 416/197 R |
| 1,527,571 | A | * | 2/1925 | Morrison | 416/131 |
| 3,897,170 | A | * | 7/1975 | Darvishian | 416/119 |
| 4,143,992 | A | * | 3/1979 | Crook | 415/220 |
| 4,149,092 | A | * | 4/1979 | Cros | 290/54 |
| 4,382,190 | A | * | 5/1983 | Jacobson | 290/55 |

(Continued)

Primary Examiner — Igor Kershteyn
(74) Attorney, Agent, or Firm — Mark M. Friedman

(57) ABSTRACT

The special circumstances of working with hydroelectric turbines in pipes require innovations in blade shapes and systems that are presented here. An example is streamlining of the blades greater than that found in traditional hydroelectric turbines.

9 Claims, 17 Drawing Sheets

(56) References Cited

U.S. PATENT DOCUMENTS

| | | | |
|---|---|---|---|
| 4,731,545 A * | 3/1988 | Lerner et al. | 290/54 |
| 5,656,865 A * | 8/1997 | Evans | 290/55 |
| 5,971,820 A * | 10/1999 | Morales | 440/8 |
| 6,508,191 B1 * | 1/2003 | Spoljaric | 114/244 |
| 2006/0137927 A1 * | 6/2006 | Fleming | 180/165 |
| 2007/0209865 A1 * | 9/2007 | Kokosalakis et al. | 181/0.5 |
| 2007/0216245 A1 * | 9/2007 | Fielder | 310/102 R |
| 2008/0048453 A1 * | 2/2008 | Amick | 290/44 |

\* cited by examiner

HYDROELECTRIC IN-PIPE TURBINE BLADES

FIELD AND BACKGROUND OF THE INVENTION

The present invention relates to a hydroelectric turbine, particularly a turbine in a confined space such as a pipe.

There are unique challenges in designing blades for turbines in piping systems as opposed to standard hydroelectric blades. Standard practice over the last two hundred years has involved jetting water through air into the blades.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to new blade shapes and relationships, particularly for an in-pipe turbine.

Definitions: The current patent application deals with fluids. Unless otherwise stated, it refers to any kind of fluid: water, oil, gas, etc.

"Blades" are interchangeable here with "cups" when they have the shape of cups.

The principles and operation of hydroelectric blades according to the present invention may be better understood with reference to the drawings and the accompanying description.

Figure 1:
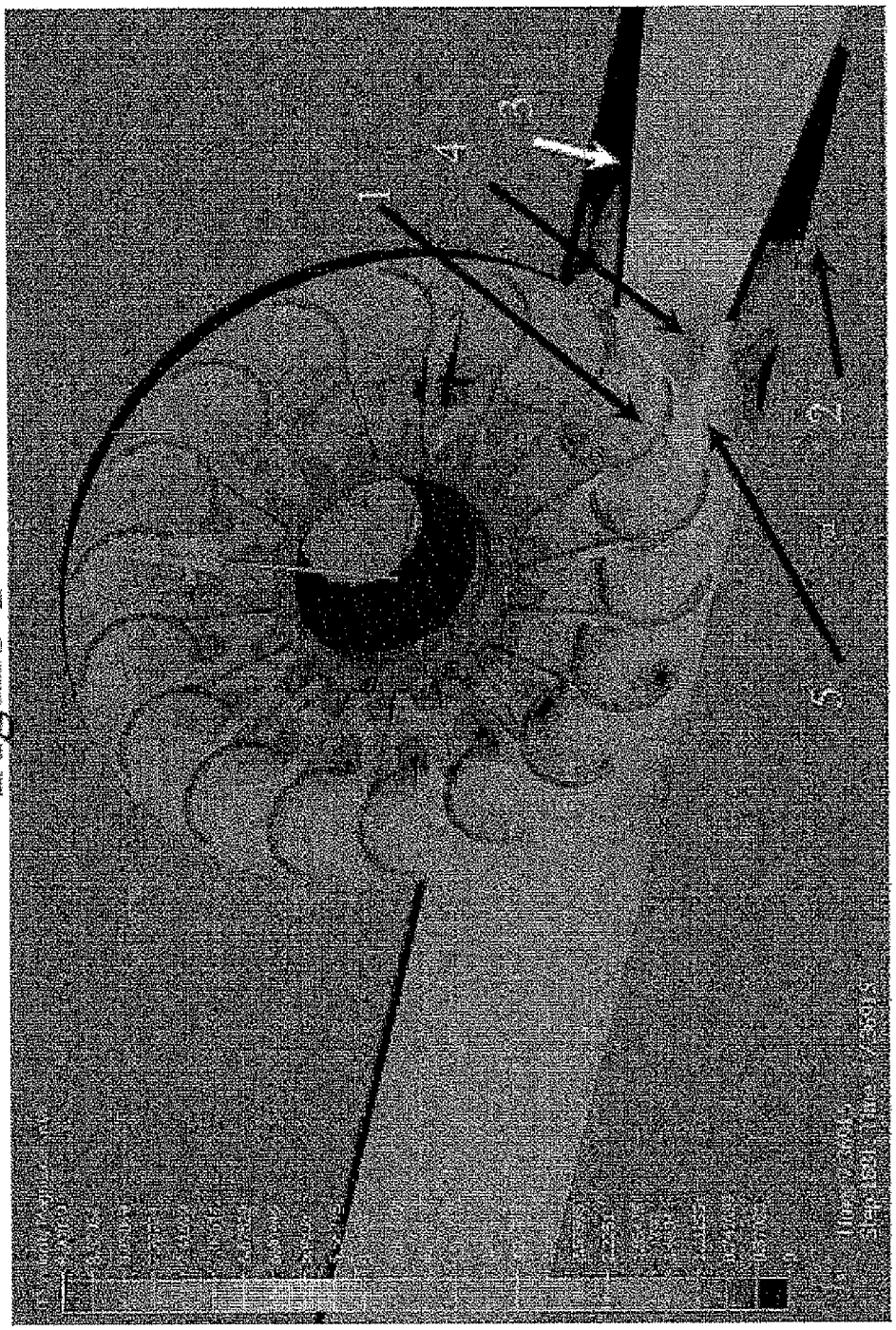
FIG. 1 is a diagram of a CFD blade analysis.

Referring now to the drawings, FIG. 1 illustrates a CFD (computational fluid dynamics) simulation of a turbine with cups (1) in a pipe (2) with a nozzle (3). Nozzles have been used in hydroelectric turbines to speed up the water entering the turbine blades. Location (4) shows the area of highest speed. Location (5) shows the deformation of the area of high-speed flow as it comes in contact with the blades. This illustrates the central problem this patent application addresses. How does one increase efficiency through blade configuration in a fluid-filled environment (defined as the fluid carrying the energy and the fluid that the energy passes through being substantially similar)? As FIG. 1 shows, the flow environment and the blades have a complex three-dimensional interaction. Note that the frontal end of the trailing blade appears to push the high velocity fluid away from the cups to the periphery. Note that throughout the path of the turbine blades there is greater velocity in the periphery. (This may be difficult to see in black and white.) This is a new problem that traditional hydroelectric machines have not grappled with.

The two simplest solutions are to decrease the distance from the nozzle to the rear of the cup and to streamline the front of the cups in ways that have not been done before.

As part of the streamlining, there is an interaction between the cross-sectional space occupied by the blade in relation to the cross-sectional area of the pipe, and the geometric relation of the space of the blade to the pipe, such as the periphery or the center.

Figure 2:
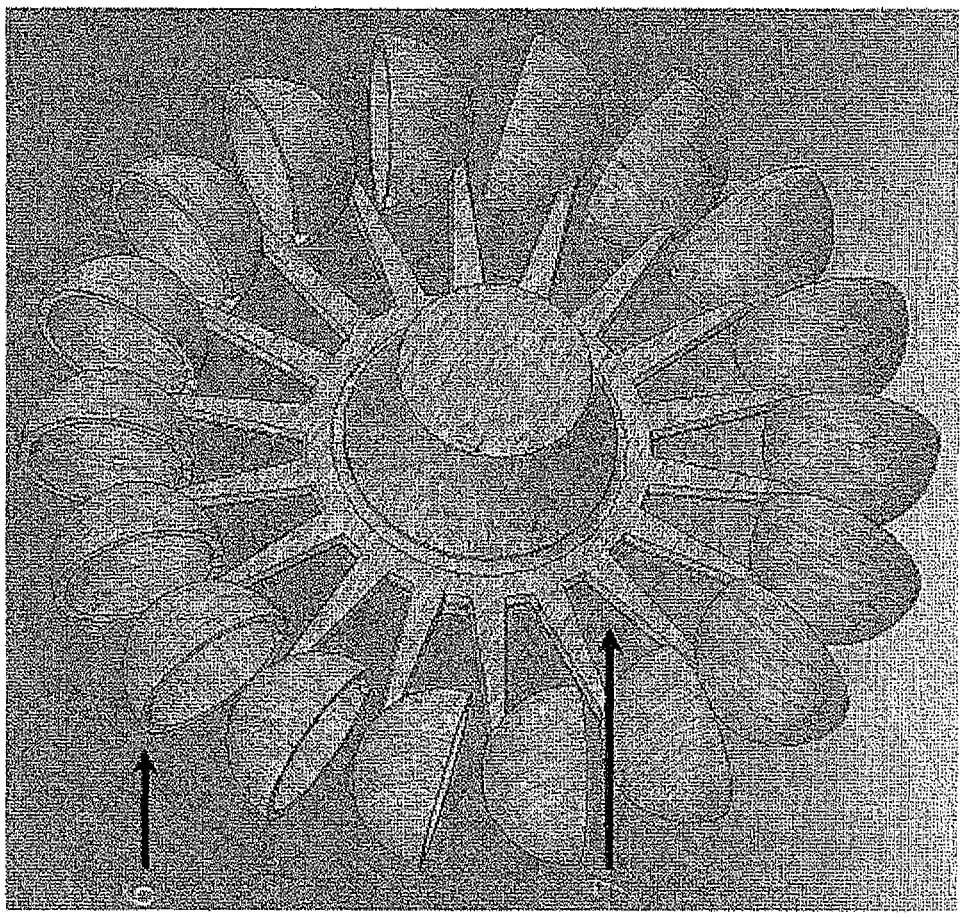
FIG. 2 is a diagram of symmetrical cups.

FIG. 2 is a diagram of symmetrical, half-globe cups (6). They do not have a dividing line in the center, as is typical in regular hydro. They are held by a thin (in the line of motion), separated structure (7) that attaches to the shaft.

Figure 3:
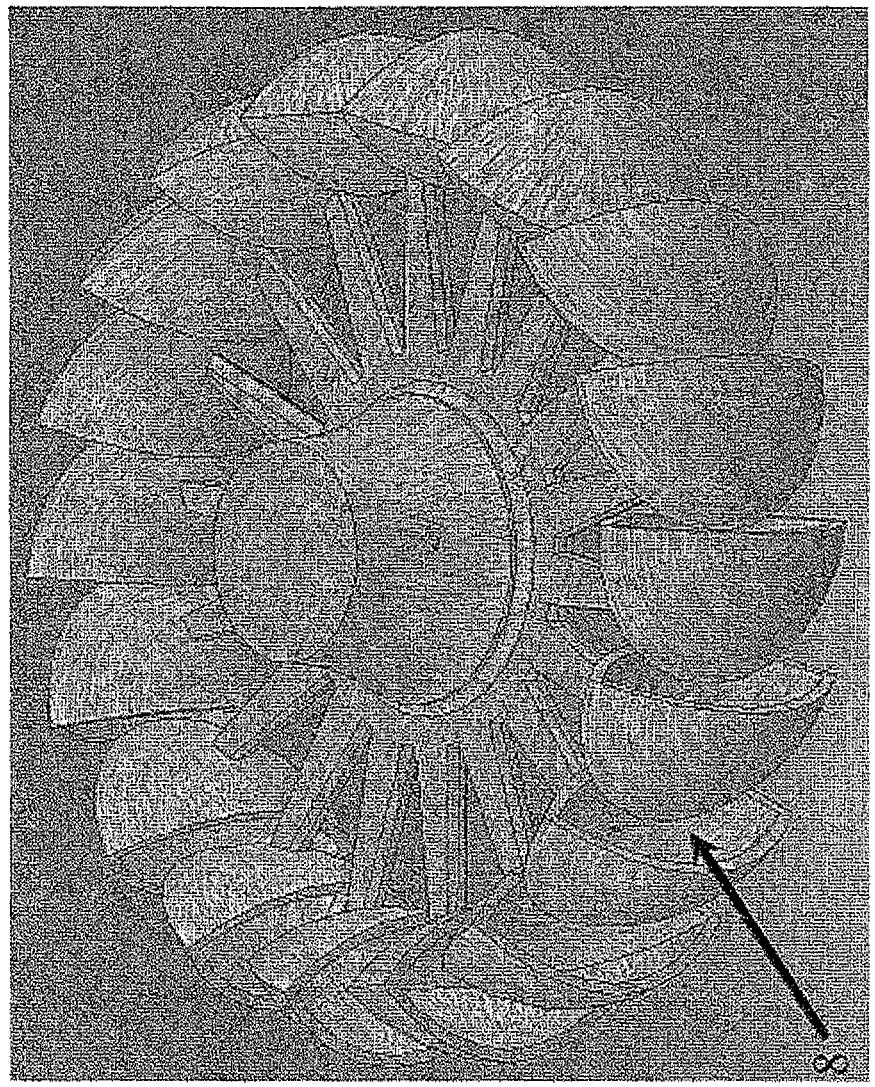
FIG. 3 is a diagram of lip-shaped cups.

FIG. 3 is a diagram of lip-shaped cups (8).

Figure 4:
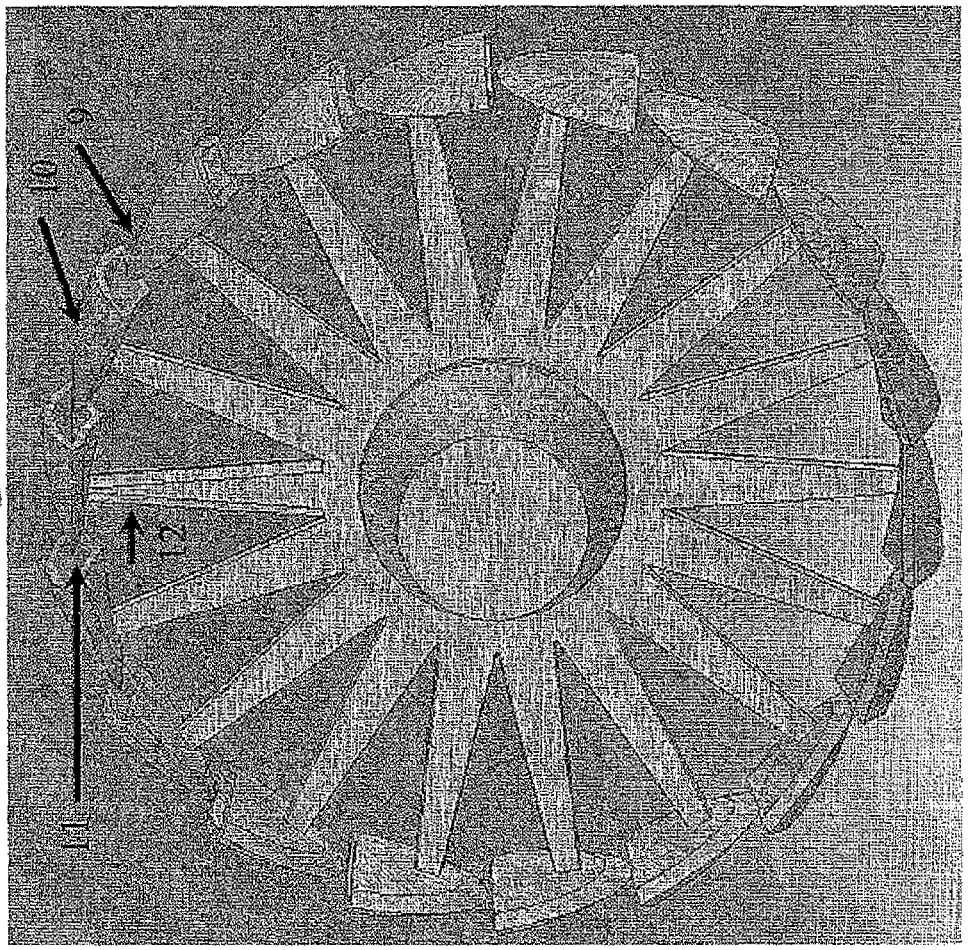
FIG. 4 is a diagram of peripheral shark cups.

FIG. 4 is a diagram of peripheral shark-like cups. The front point (9) is extremely streamlined. The outer perimeter (10) is approximately congruent to the outside of the turbine chamber. The rear of the cup (11) is almost diamond-shaped in this picture but it can have other shapes as well that are substantially broader than that of the front (9). They are held to the shaft by thin structures (12).

Figure 5:
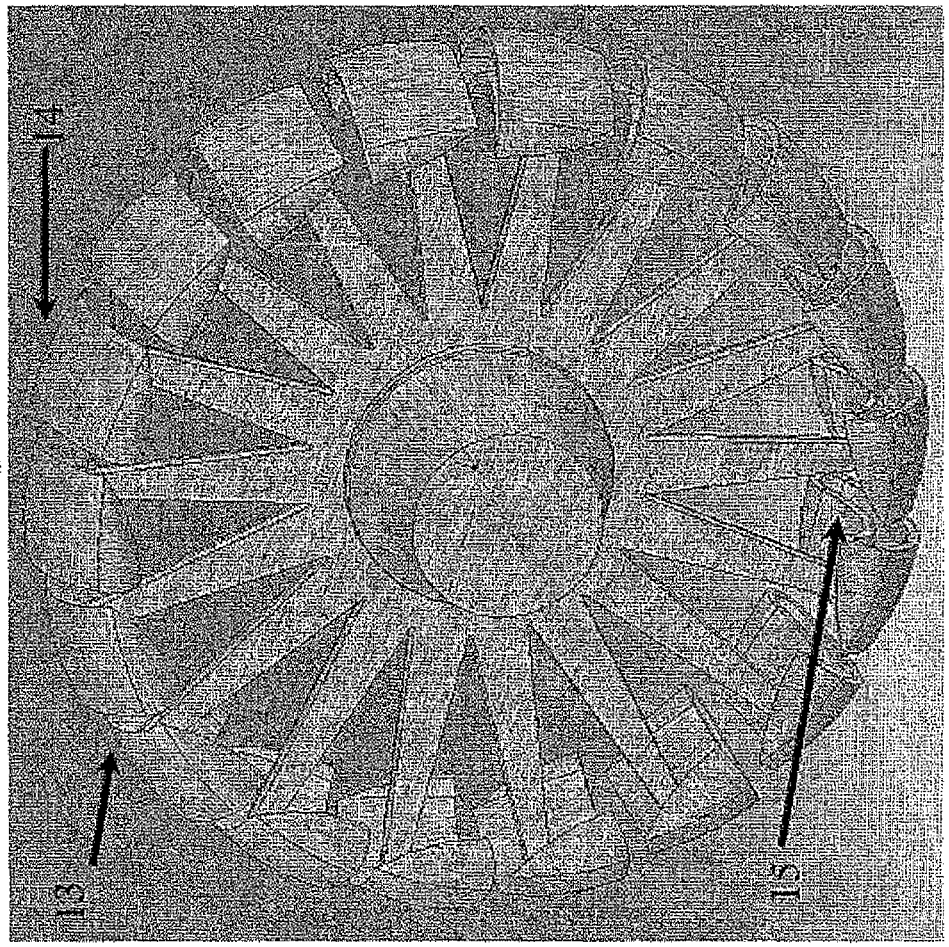
FIG. 5 is a diagram of clown smile shark cups.

FIG. 5 is a diagram of clown smile shark cups. This variation also has a sharp forward section (13) but that point is broad instead of a single point, and its outer perimeter (14) also approximates that of the turbine chamber. The internal perimeter (15) is a curve that is substantially congruent with the shape of the turbine chamber so that a smooth surface is effectively presented to the turbine fluid on the inside. It creates an almost uniform surface as it rotates.

Figure 6:
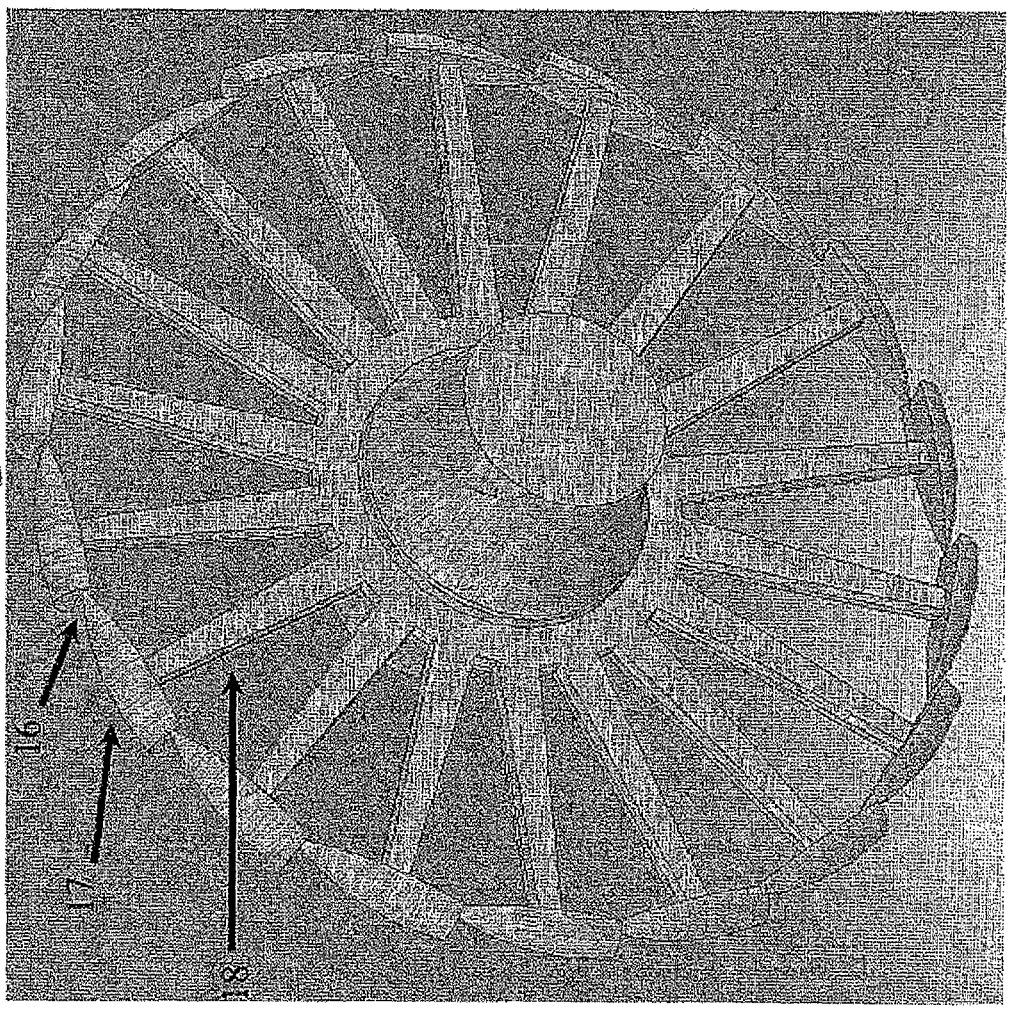
FIG. 6 is a diagram of thin peripheral shark cups.

FIG. 6 is a diagram of thin peripheral shark cups. It has a very thin forward point (16) and a thin body (17). The space (18) between adjacent blades decreases the weight. FIG. 6 shows how the size of the cup can be reduced greatly in order to obtain minimal amounts of power for certain equipment while not interrupting the flow in the pipe, or to decrease the pressure by specific amounts.

Figure 7:
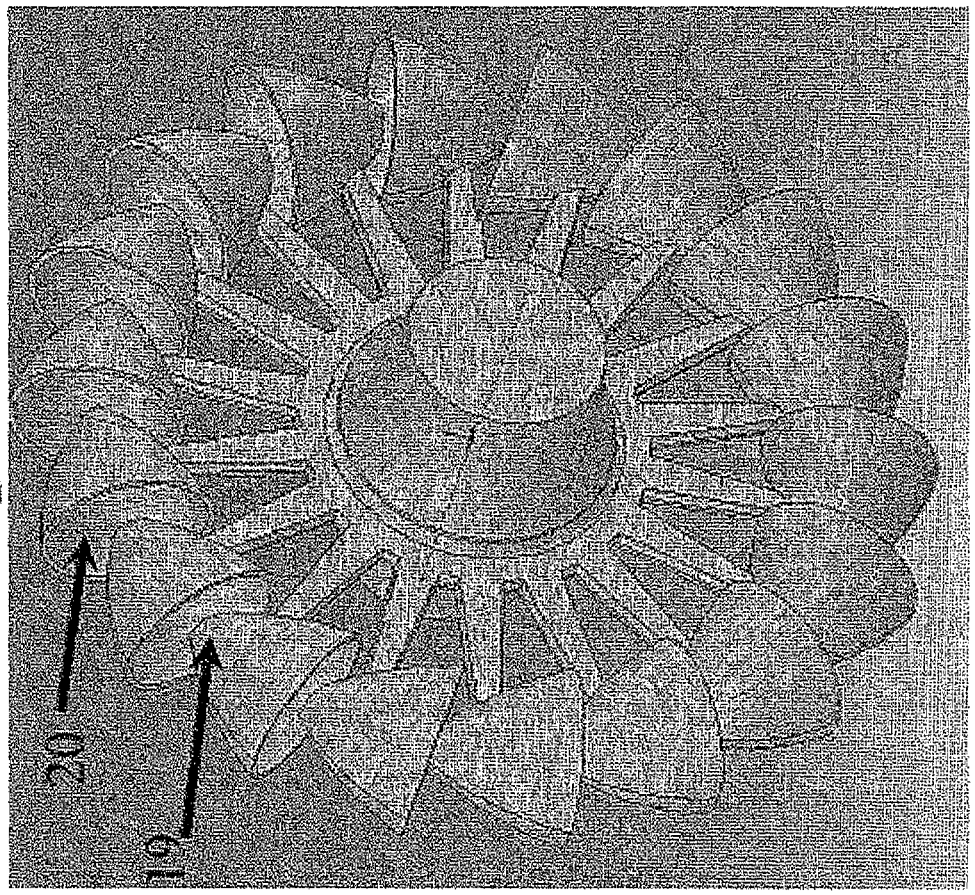
FIG. 7 is a diagram of cone cups.

FIG. 7 is a diagram of cone cups. They have a sharp forward point (19) and a rear cup (20), ideally with the cup interior partially filled in.

Figure 8:
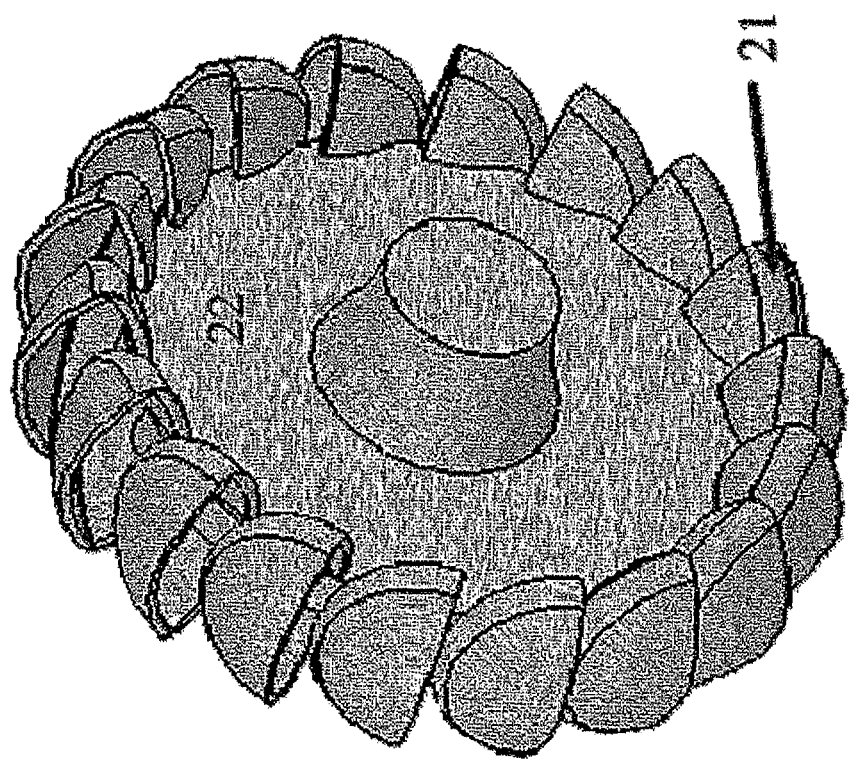
FIG. 8 is a diagram of elliptical cups with a frontal band

FIG. 8 is a diagram of elliptical cups with a frontal band (21). Here a single thin structure (22) connects the blades to the shaft. This is not a necessary part of the band design and could be used with any configuration.

Figure 9:
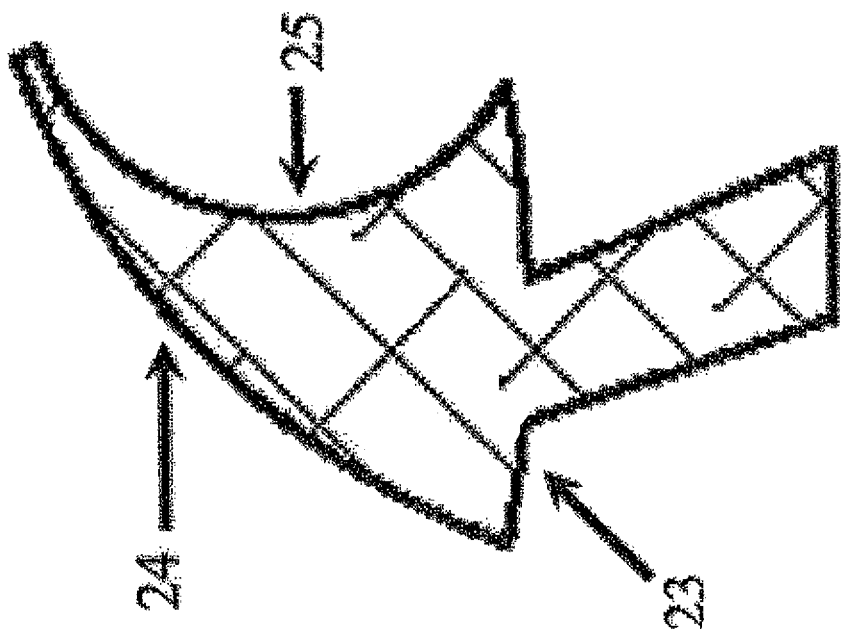
FIG. 9 is a diagram of shark cup parameters.

FIG. 9 is a diagram of shark cup parameters. Inner perimeter (23) and outer perimeter (24) come to a sharp point in the front. A partially filled in cup (25) at the rear brings the rear cup closer to the nozzle.

Figure 10:
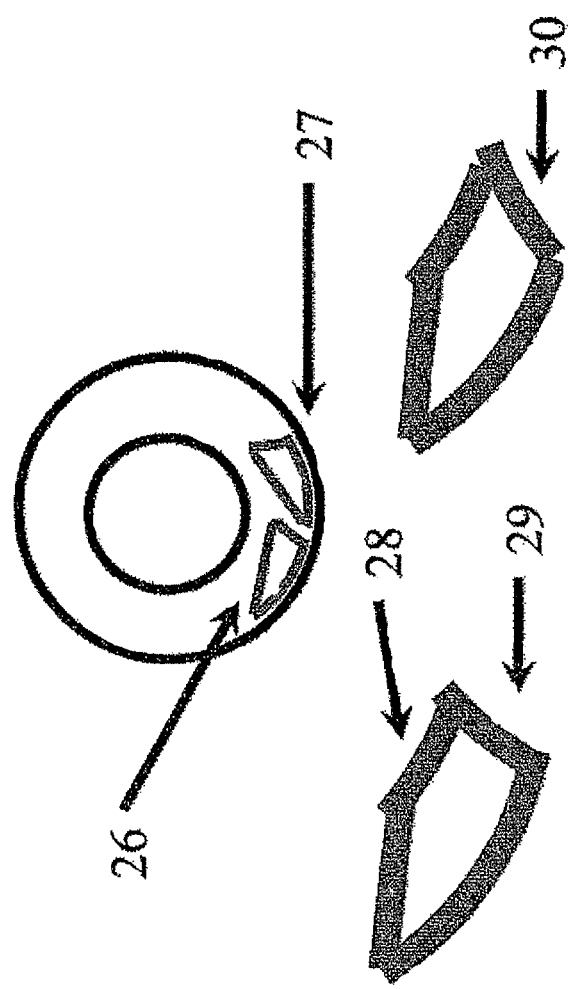
FIG. 10 is a diagram of more shark cup parameters.

FIG. 10 is a diagram of more shark cup parameters. The cup outer perimeter (27), frontal point (26), and turbine inner perimeter (28) have been shown before. This figure particularly shows the angle of the cup's rear (29, 30) as another parameter. The angles between parts (27) and (28) can be adjusted in accordance with the blade's relationship to the nozzle and other turbine conditions. In both, the orientation of the rear cup is acute to the forward motion of the blades.

Figure 11:
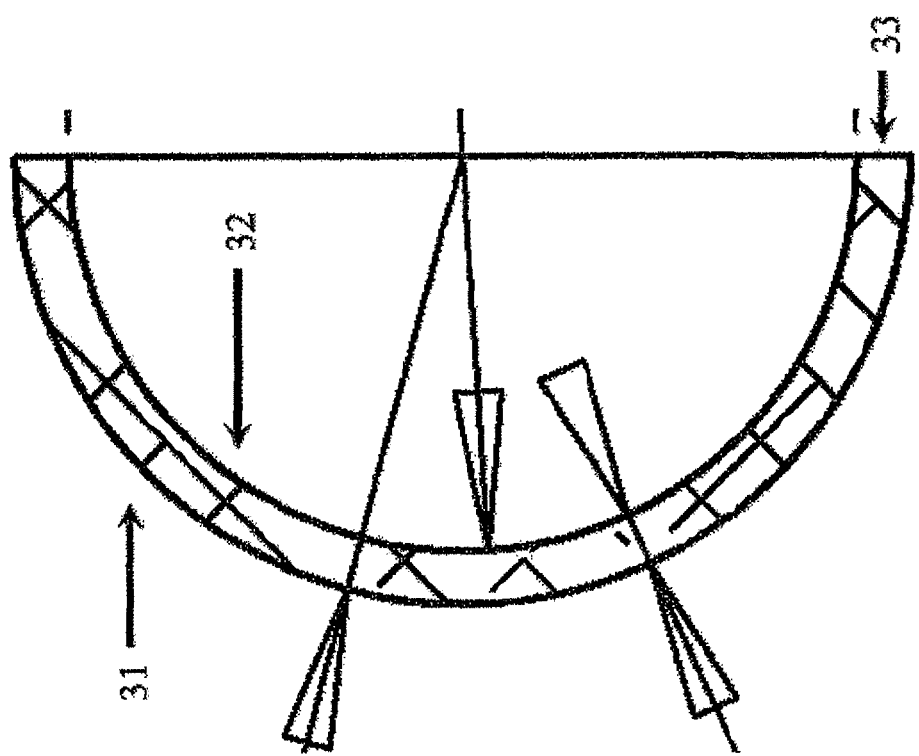
FIG. 11 is a diagram of blade cup parameters number 1.

FIG. 11 is a diagram of blade cup parameters number 1. The frontal cup shape (31) and the rear cup shape (32), instead of coming to a point, have a thickened, platform-like area (33) because they are basically congruent.

Figure 12:
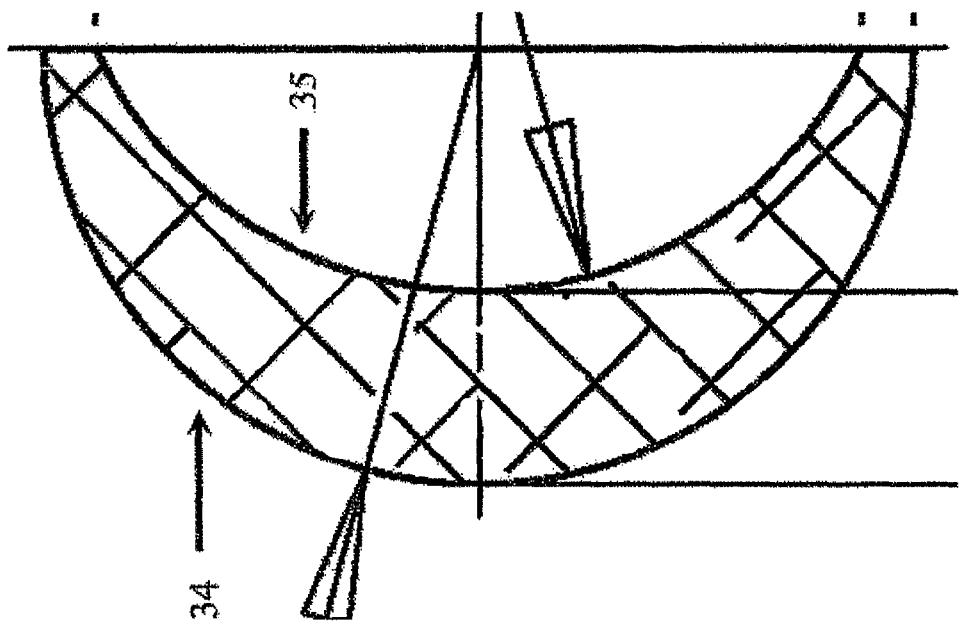
FIG. 12 is a diagram of blade cup parameters number 2.

FIG. 12 is a diagram of blade cup parameters number 2. The frontal cup shape (34) and the rear cup shape (35) comprise non-congruent circles.

Figure 13:
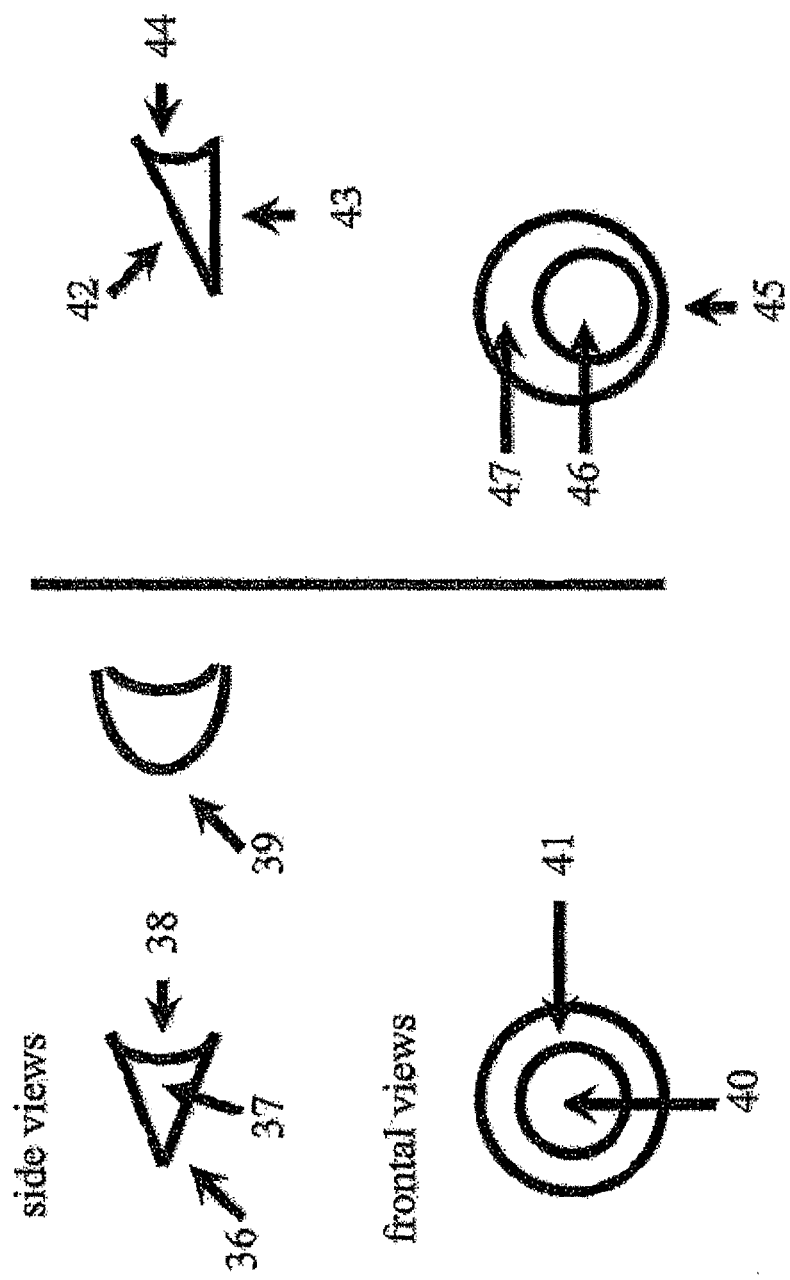
FIG. 13 is a diagram of blade cup parameters number 3.

FIG. 13 is a diagram of blade cup parameters number 3. It shows how any shape, here a cone shape with frontal point (36), can provide a non-congruent rear cup (38). A unique point here is the possibility of making the interior of the cup hollow (37). The same concept with a variation of the cone shape is seen in (39). In one such variant, the rear cup and its platform are symmetrical in a rear cross-section. But that need not be. Another blade with a shark-type structure has an inner periphery (42), an outer periphery (43), and a rear cup (44) that are not symmetrical in frontal cross-section, so that the symmetrical outer cross-section (45) has an inner symmetrical cross-section (46) that is off-center, making the platform (47) irregular.

Figure 14:
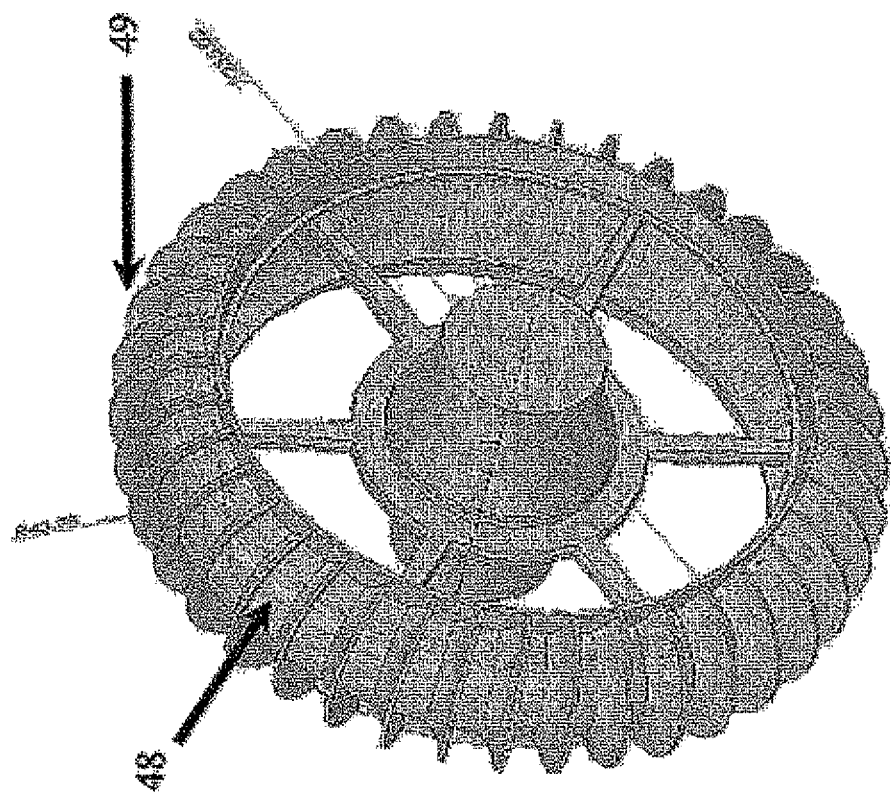
FIG. 14 is a diagram of peripheral ring cups.

FIG. 14 is a diagram of peripheral ring cups. A tube-like inner section (48) is surrounded by rounded cups (49).

Several common principles emerge. The interior area should be left open with substantially the inner half free of blade obstruction, within the limits of reason that the blade shape can overlap a little in one area and take up decreased space in another. The slower flow area is on the inside. This fits in with the simulation shown. This leads to the concept of using highly streamlined blades on the interior side, while the outer area conforms to the shape of the pipe and its side-chamber. This deflects slower moving fluid to the center. A good way to visualize it is the shape of a shark's head; the rear end has the cup shape in one embodiment that the fluid is jetted against so that the interior of the blade is optionally hollow. In another embodiment, the rear cup shape is open. The back indentation or cup is shallow, at minimum shallower than the front edge, thereby allowing greater proximity to the source of the flow.

One variant is tilting the back surface (29, 30) up to about 20 degrees from the perpendicular to the pipe outer surface in the direction of the nozzle in order to be directed to the higher velocity flow as shown in FIG. 1. The method is that the back surface angle should be perpendicular to the vector of the highest velocity flow.

Figure 15:
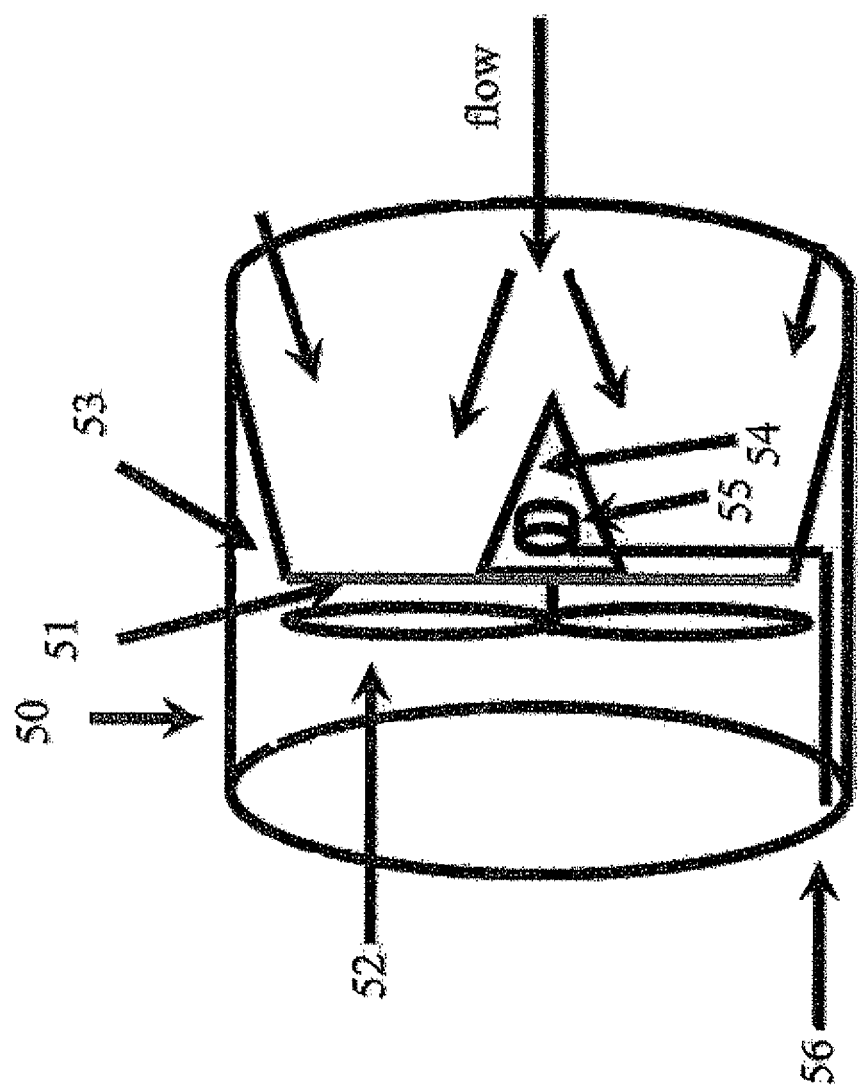
FIG. 15 is a diagram of an in-pipe propeller with a generator.

FIG. 15 is a diagram of an in-pipe propeller with a generator. A pipe (50) holds a structure (51) that holds a propeller (52). Here a ring (53) at the periphery and a central structure (54), ideally conical, at the center funnel the flow. In one embodiment, the central cone can also hold the generator (55). In one embodiment, a wire can then extend on the interior of the pipe until it reaches a suitable location for it to exit or combine with other sources of electricity.

A novelty of its construction is that the blades are held by a structure upstream from the blades, in one embodiment in a pipe. This then enables a flow deflector to be placed over the hub in the center so that it diverts the flow peripherally and symmetrically, since the movement over the hub is not useful. The combination of upstream fixation and a central flow deflector is unique, with and without a peripheral flow deflector, ideally symmetrical as well.

Figure 16:
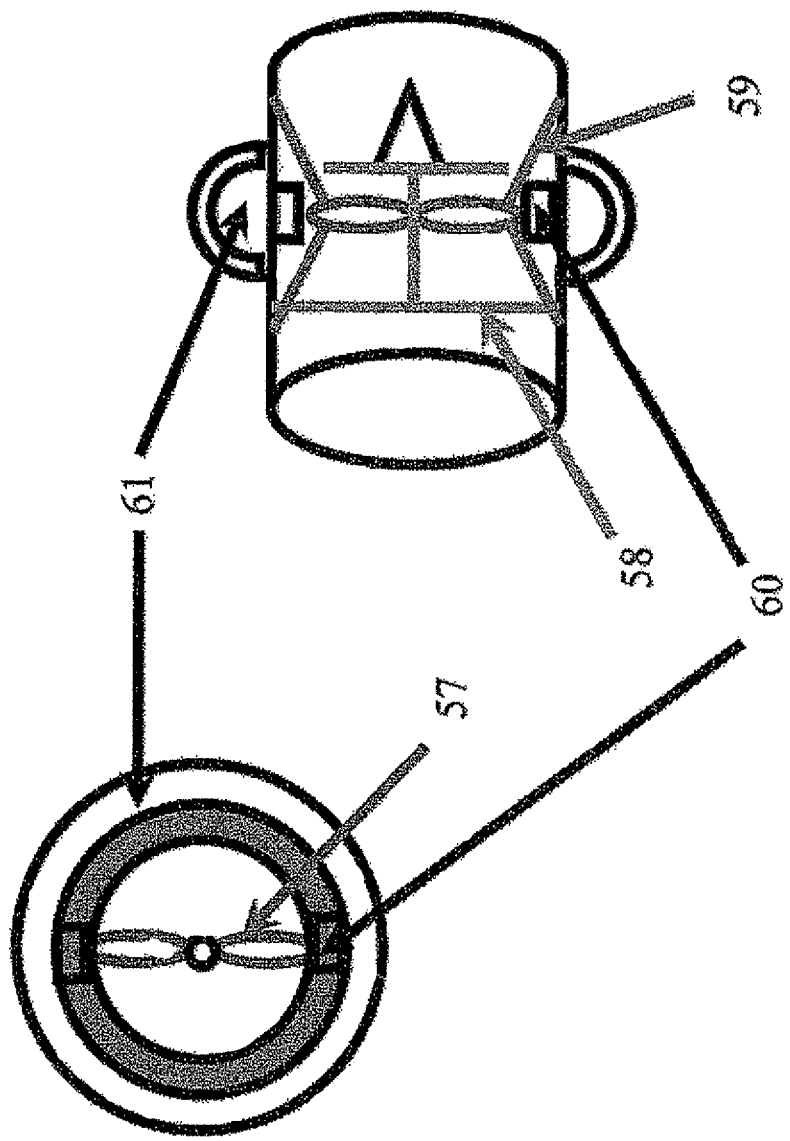
FIG. 16 is a diagram of an in-pipe propeller with coils.

FIG. 16 is a diagram of an in-pipe propeller with coils. Similarly, a structure (58) holds the propeller (57) inside the pipe, and a funneling system as in part (59) exists. The difference here is that the ends of the blades sheltered by the funneling system have magnets (60) and an outer ring for a coil (61).

An alternate system can be with the propeller shaft attached to a gear or gear and belt that turns the generator shaft, either directly, or through a magnetic coupling.

The devices and methods of changing the propellers' shapes and sizes to accommodate different reductions in pressure between the upstream and downstream areas are hereby presented.

Figure 17:
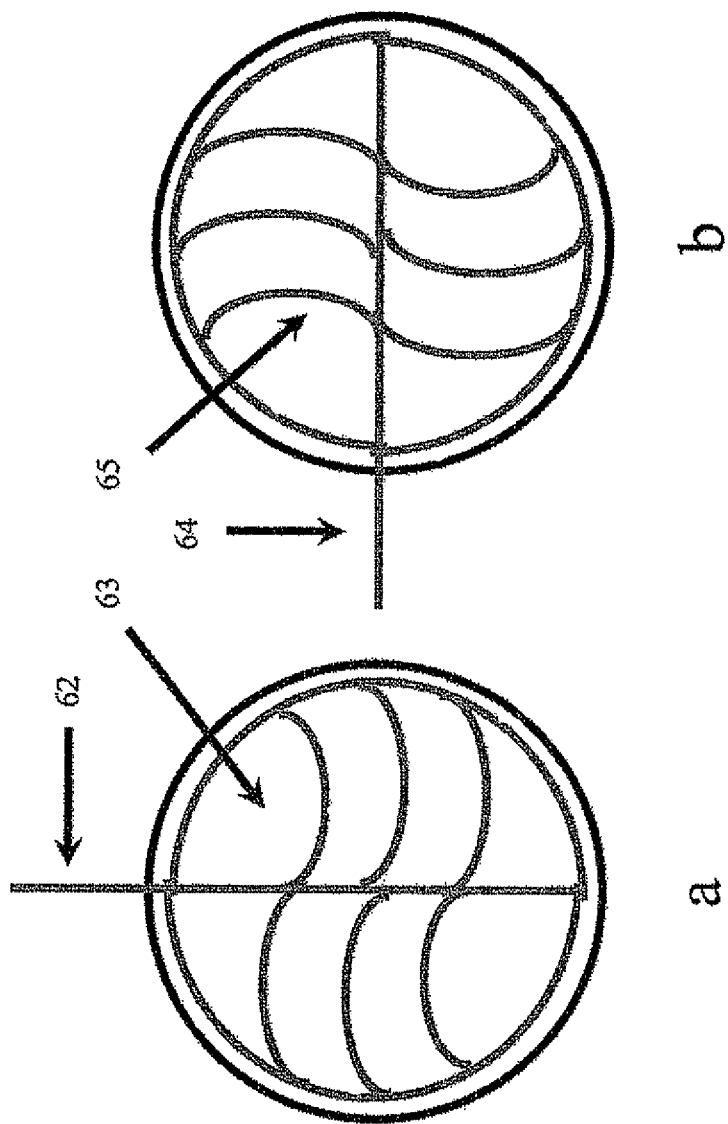
FIG. 17 is a diagram of an in-pipe vertical axis turbine.

FIG. 17 is a diagram of an in-pipe vertical axis turbine. The picture shows a two-bladed variety in an S shape (63, 65), and this is claimed as an embodiment in this circumstance. The use of a two-bladed variety with a central gap of the Savonius wind type is also claimed. The shaft axis may be vertical (62) or horizontal (64). The reason for this is that theoretically configuration b (64) will work better with a nozzle as per FIG. 1, which shows that the rotation of the turbine and gravity pushed the liquid to the exterior. With this orientation, the whole bottom can receive the increased flow area in the vector of its operation. In all cases, the blades do not necessarily need to approximate the cross-section of the pipe, and they can also be smaller.

Here is a summary of relevant cup parameters:
Relationship of cup cross-section to pipe cross-section in area
Peripheral location of cups
Shape, angle, and size of frontal structure
Shape, angle, and size of rear structure
Shape, angle, and size of peripheral side
Shape, angle, and size of central side
The structure that holds the cups While the invention has been described with respect to a limited number of embodiments, it will be appreciated that many variations, modifications and other applications of the invention may be made.

SUMMARY OF THE INVENTION

The present invention successfully addresses the shortcomings of the presently known configurations by providing a series of highly streamlined blades for in-pipe hydroelectric turbines.

It is now disclosed for the first time a hydroelectric turbine with highly streamlined cups, defined as an angle of less than 45 degrees from the central forward point to the peripheral rear point.

According to another embodiment, it is located within a pipe.

It is now disclosed for the first time a hydroelectric turbine, comprising cups, whose forward section comprises a sharp single or extended point.

According to another embodiment, it is located within a pipe.

It is now disclosed for the first time a hydroelectric turbine, comprising cups, whose front and rear portions are not substantially congruent, and whose rear portion is shallower.

According to another embodiment, it is located within a pipe.

According to another embodiment, the said cups are hollow between the front and rear potions.

According to another embodiment, the forward section of said cups comes to a sharp single or extended point.

It is now disclosed for the first time a cup for a hydroelectric turbine in a pipe, wherein the inner periphery and outer periphery are asymmetrical.

It is now disclosed for the first time a cup for a hydroelectric turbine in a pipe, wherein the rear platform is asymmetrical.

It is now disclosed for the first time a cup for a hydroelectric turbine in a pipe, wherein the rear platform has a cross-sectional area of greater than 5% of the rear cross-sectional area.

It is now disclosed for the first time a cup for a hydroelectric turbine, wherein the plane of the rear cross-section is not perpendicular to the direction of motion of the cup.

According to another embodiment, the turbine is in a pipe.

It is now disclosed for the first time a hydroelectric turbine in a pipe, comprising cups that extend no more than the peripheral 50% of the diameter of the turbine.

It is now disclosed for the first time a hydroelectric turbine in a pipe, comprising cups whose outer periphery is substantially congruent with the walls of the turbine and whose inner periphery is not substantially congruent with the walls of the turbine.

It is now disclosed for the first time an in-pipe hydroelectric turbine, comprising:
a. A propeller,
b. A central substantially conical structure upstream from the propeller, held in place either by a structure connected to the propeller or by a separate structure.

In one embodiment, the system further comprises:
c. A generator within the central structure.

In one embodiment, the system further comprises:
d. A conductive wire extending along the pipe from the generator,
e. An electrical output system that combines the electrical output of at least two said wires into a single electrical output.

(This is highly useful in decreasing the number of interfaces required in piping systems.)

In one embodiment, the system further comprises:
c. A peripheral narrowing structure upstream from the propellers.

In one embodiment, the system further comprises:
c. Magnets attached directly or indirectly to the periphery of the propellers in association with a coil outer ring.

In one embodiment, the system further comprises:
d. A peripheral narrowing structure upstream from the propellers, thereby sheltering the magnets from the forward fluid flow.

It is now disclosed for the first time a blade holder for a hydroelectric turbine in a pipe, wherein said holder is thin in the line of motion of the turbine.

It is now disclosed for the first time a hydroelectric turbine in a pipe, comprising:
a. Vertical axis turbine blades.

According to another embodiment, the axis of the turbine points sideways.

What is claimed is:

1. A turbine, comprising:
a central support member; and,
a plurality of cups arranged along the central support member in accordance with a direction of motion of the central support member, each of the cups in communication with the central support member, each of the cups including a closed leading edge oppositely disposed from an open trailing edge, a body intermediate the closed leading edge and the open trailing edge and tapering outward from the closed leading edge to the open trailing edge, the leading edge defining a first arc of a first radius of curvature and the trailing edge defining a second arc of a second radius of curvature, the first radius of curvature smaller than the second radius of curvature, and the cups are positioned with respect to each other such that leading edge of subsequent cup follows trailing edge of previous cup.

2. The turbine of claim 1, wherein the leading edge terminates at a point.

3. The turbine of claim 1, wherein the central support member is circular.

4. The turbine of claim 3, additionally comprising, an inner periphery extending along the body proximate to the central support member, and an outer periphery, extending along the body, distal to the central support member and oppositely disposed from the inner periphery, that are asymmetrical.

5. The turbine of claim 3, wherein the plane of the trailing edge of the cup is not perpendicular to the direction of motion of the cup.

6. The turbine of claim 2, wherein each cup is attached to the central support member by an arm.

7. The turbine of claim 3, wherein the cups attach to the central support member along the periphery of the turbine.

8. The turbine of claim 1, wherein the outward taper is less than 45 degrees.

9. The turbine of claim 1, additionally comprising: an internal cavity formed within the body extending from the closed leading edge to the open trailing edge.

\* \* \* \* \*